US008256556B2

United States Patent
Inose et al.

(10) Patent No.: US 8,256,556 B2
(45) Date of Patent: Sep. 4, 2012

(54) VEHICLE SHROUD

(75) Inventors: Tadashi Inose, Tokyo (JP); Satoshi Oohashi, Shizuoka-ken (JP); Takayoshi Muramatsu, Shizuoka-Ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 136 days.

(21) Appl. No.: 12/656,168

(22) Filed: Jan. 20, 2010

(65) Prior Publication Data

US 2010/0181132 A1    Jul. 22, 2010

(30) Foreign Application Priority Data

Jan. 20, 2009   (JP) .................................. 2009-009436

(51) Int. Cl.
*B62D 61/02*    (2006.01)
(52) U.S. Cl. ...................................................... 180/219
(58) Field of Classification Search .................. 180/219, 180/229, 68.1–68.6; 280/285; 296/181.5, 296/181.1, 192, 193.05, 33, 78.1
See application file for complete search history.

(56) References Cited

U.S. PATENT DOCUMENTS

| 6,651,769 | B2 * | 11/2003 | Laivins et al. ................. 180/229 |
| 6,655,486 | B2 * | 12/2003 | Oshikawa et al. ............ 180/68.1 |
| 7,445,070 | B1 * | 11/2008 | Pickering ...................... 180/211 |
| 7,537,077 | B2 * | 5/2009 | Nakashima et al. .......... 180/229 |
| 7,654,357 | B2 * | 2/2010 | Buell et al. ..................... 180/229 |
| 7,686,116 | B2 * | 3/2010 | Oohashi et al. ................ 180/219 |
| 7,850,221 | B2 * | 12/2010 | Nakata et al. ................. 296/78.1 |
| 2006/0000652 | A1 * | 1/2006 | Yamaguchi et al. .......... 180/68.3 |
| 2006/0175112 | A1 * | 8/2006 | Yoshida et al. ............... 180/229 |
| 2006/0254844 | A1 * | 11/2006 | Nakashima et al. .......... 180/229 |
| 2008/0156566 | A1 * | 7/2008 | Oohashi et al. ............... 180/229 |
| 2009/0008182 | A1 * | 1/2009 | Buell et al. ..................... 180/229 |

FOREIGN PATENT DOCUMENTS

JP    2006-282050    10/2006

* cited by examiner

*Primary Examiner* — Tashiana Adams
(74) *Attorney, Agent, or Firm* — Rabin & Berdo, P.C.

(57) ABSTRACT

A vehicle shroud can include a frontward portion, an intermediate portion, and a rearward portion. The vehicle shroud can have formed therein at least one opening extending in a substantially front-to-rear direction. A substantially horizontal portion of a front fender of the vehicle can be located frontward of, and be substantially aligned with, the opening. The vehicle can be a motorcycle, for example.

17 Claims, 5 Drawing Sheets

VEHICLE SHROUD

CROSS-REFERENCE TO RELATED APPLICATIONS

This application claims priority under 35 U.S.C. § 119 from Japanese Patent Application No. 2009-009436, filed Jan. 20, 2009, the entirety of which is incorporated herein by reference.

BACKGROUND OF THE INVENTION

1. Field of the Invention

Embodiments of the present invention relate to a vehicle, and more particularly to a shroud for the vehicle. In embodiments, the vehicle can be a motorcycle.

2. Description of Related Art

Certain off-road-type motorcycles, such as motocrosser-type motorcycles, have a cover called a shroud. An example is described in JP 2006-282050 A, for instance. The shroud covers the sides of a front portion of the motorcycle, and serves to supply air flow from the front of the motorcycle to the engine. If the motorcycle has a water-cooled engine, the shroud supplies the air flow to the radiator.

SUMMARY OF THE INVENTION

Embodiments of the invention relate to a shroud for a vehicle, such as a motorcycle, that can effectively take in and discharge air to, among other things, better cool the motorcycle. A motorcycle according to the embodiments can comprise a front wheel, a front fork for supporting the front wheel, an under bracket coupled to the front fork, and a steering shaft coupled to the front fork via the under bracket. The motorcycle according to the embodiments can further comprise a head pipe for rotatably supporting the steering shaft, and a body frame extending from the head pipe obliquely downward and rearward, as viewed from one side of the motorcycle.

The motorcycle according to the embodiments can still further comprise a shroud having an upper edge portion extending substantially horizontally as viewed from one side of the motorcycle, the shroud covering a side of at least a portion of the frame, extending frontward, and extending outward in a widthwise direction of the motorcycle, and a front fender. The front fender can include an upper edge portion extending substantially horizontally, as viewed from one side of the motorcycle, the front fender attached to the under bracket and covering a region over the front wheel. An upper edge portion of the front fender can be substantially aligned with the upper edge portion of the shroud, as viewed from one side of the motorcycle.

Embodiments of the invention further relate to a vehicle shroud, comprising a frontward portion, an intermediate portion, and a rearward portion. In a side view of vehicle shroud, the frontward portion can have an upper edge, a nose, and a lower obliquely-extending edge, the intermediate portion can have a substantially downward-extending edge, a bottom edge, and an upward-extending edge, the rearward portion having, in the side view, a substantially rearward-extending edge. The vehicle shroud can have a branched or bifurcated opening formed therein, the branched opening having a first branch and a second branch, the first branch being longer than the second branch. When the vehicle shroud is in place on a vehicle, such as a motorcycle, the upper edge can extend substantially horizontally, and be substantially aligned with a substantially horizontal portion of a fender of the vehicle.

In still further embodiments of a vehicle shroud according to the invention, in a side view of the vehicle shroud, first and second openings each having an approximately triangular shape can be formed in approximately a center portion of the vehicle shroud, the first opening extending at least partly over the intermediate portion and the second opening extending substantially along the rearward portion With the above-described structures, improved handling of air flow against the front of the motorcycle can be realized. More specifically, the shroud can smoothly discharge air that has been taken inside the shroud to the outside of the shroud, and increase the amount of the air flowing from the shroud to the rear, thereby improving the cooling performance of the engine, for example. Other features, elements, steps, characteristics and advantages of the invention will become more apparent from the following detailed description of embodiments of the invention with reference to the attached drawings.

DETAILED DESCRIPTION OF THE INVENTION

Figure 1:
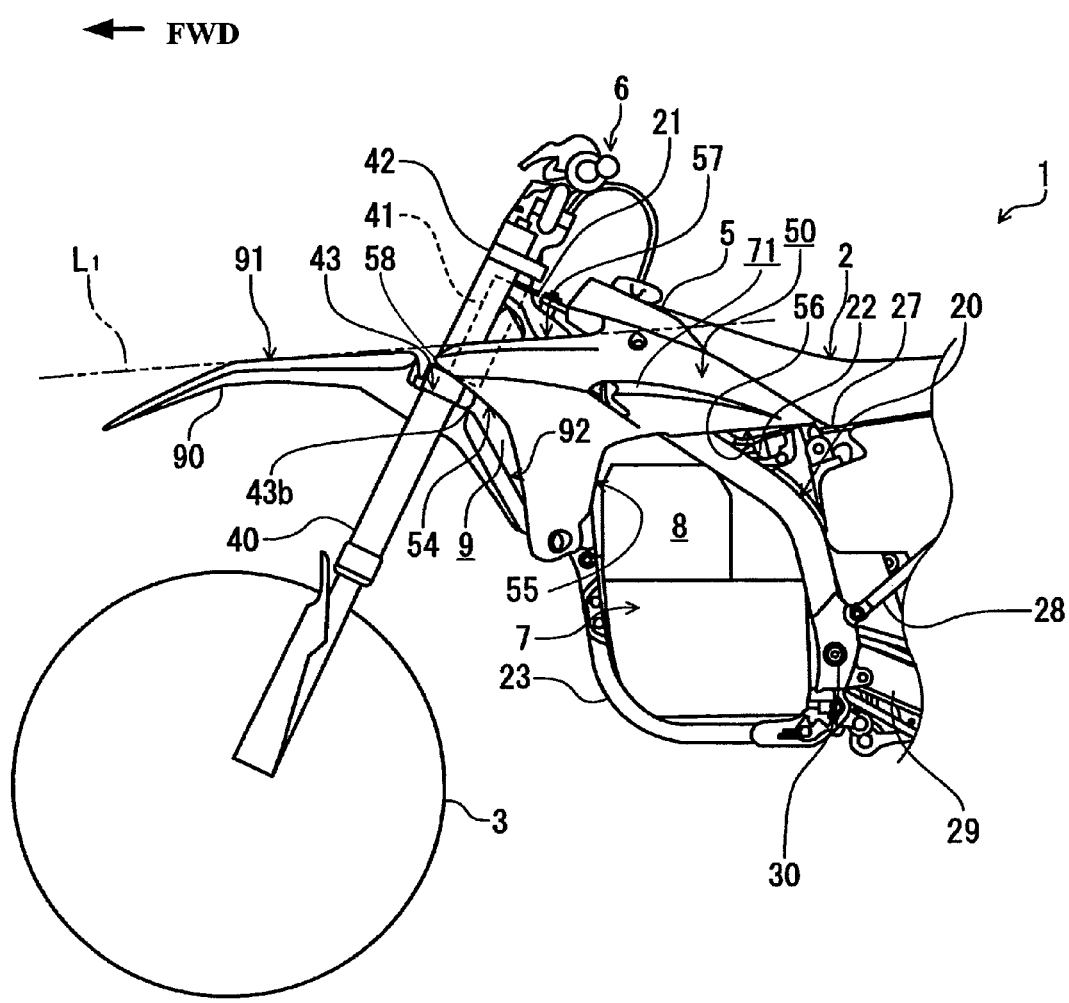
FIG. 1 is a side view illustrating a motorcycle according to a first exemplary embodiment of the invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Additionally, the following description includes references to directions, such as "front," "frontward," "ahead," "back," "rear," "rearward," "behind," "right," "left," "above," "below," "up," "upward," "down," "downward," "forward," "backward," "widthwise," "lengthwise," "horizontal" and "vertical." As used herein, these terms reflect the perspective of a person facing in the direction indicated by the arrow labeled "FWD" in the drawings, such as a rider seated on or straddling the motorcycle 1 and facing toward the front wheel 3. Thus, the arrow labeled "FWD" indicates a back-to-front direction relative to the motorcycle 1, or an advancing direction of the motorcycle 1. A direction specified as "left" or "right" in the description refers to left or right with respect to the FWD direction or a direction opposite (e.g. 180 degrees from) to the FWD direction. "Widthwise" corresponds to a direction substantially transverse to the FWD direction or to a direction opposite to the FWD direction, e.g., a left-to-right or right-to-left direction. "Lengthwise" (with respect to the motorcycle 1) corresponds substantially to the FWD direction or to a direction opposite to the FWD direction. "Vertical" refers to a direction substantially transverse to both the widthwise and lengthwise directions, and corresponds substantially to "upward" and/or "downward." "Horizontal" refers to a direction substantially transverse to the vertical direction, and corresponds substantially to the FWD direction or to a direction opposite to the FWD direction.

First Exemplary Embodiment

FIG. 1 is a left side view illustrating a motorcycle 1 according to a first exemplary embodiment. An overview of the configuration of the motorcycle 1 follows, with reference to FIG. 1.

FIG. 1 illustrates an example of what is commonly termed a "motocrosser"-type motorcycle. However, embodiments of the invention are not limited to any particular kind of motorcycle or vehicle, and could be realized, for example, in an on-road-type motorcycle, a scooter-type motorcycle, a moped-type motorcycle, or other type of motorcycle or vehicle.

The motorcycle 1 can be equipped with a vehicle body frame 20 forming a framework. The motorcycle 1 can further be equipped with a seat 2 for seating a rider, a front wheel 3, and a rear wheel (not shown). The front wheel 3 can be disposed at a front portion of the motorcycle 1, and be supported by a front fork 40. The front fork 40 can include a pair of left and right fork tubes, and the front wheel 3 can be disposed between the left and right fork tubes. The front fork 40 can slope rearward from a substantially vertical direction as viewed from one side of the motorcycle, and can absorb shocks from the road surface received by the front wheel 3. When absorbing a shock, the front wheel 3 can move in accordance with movements of the front fork 40.

A steering shaft 41 can be provided at substantially a central position between the left and right fork tubes of the front fork 40, as viewed from the front of the motorcycle. The steering shaft 41 can extend along a slope substantially the same as that of front fork 40, between an upper bracket 42 and an under bracket 43. The front fork 40, the upper bracket 42, and the under bracket 43 can be coupled to each other.

The steering shaft 41 can be coupled to the front fork 40 via the under bracket 43 and the upper bracket 42.

The motorcycle 1 can include a head pipe 21 that rotatably supports the steering shaft 41. The vehicle body frame 20 can extend from the head pipe 21 obliquely downward and rearward, as viewed from one side of the motorcycle.

As illustrated in FIG. 1, the vehicle body frame 20 can include a main frame 22 and a down frame 23. The main frame 22 can extend from the head pipe 21 obliquely downward and rearward, as viewed from one side of the motorcycle. Below the main frame 22, the down frame 23 can extend from the head pipe 21 obliquely downward and rearward, as viewed from one side of the motorcycle.

The upper bracket 42 can be located above the head pipe 21. A steering handle 6 can be provided above the head pipe 21 and the upper bracket 42. The steering handle 6 can be coupled to the upper bracket 42.

In the motorcycle 1, the main frame 22 can be configured to have a pair of portions, e.g., left and right frame portions. Alternatively, the main frame 22 can comprise or be formed as a single, integral frame. A pair of left and right seat rails 27 can be connected to the main frame 22. As illustrated in FIG. 1, the seat rails 27 can extend obliquely rearward and upward. A backstay 28 can be connected to a portion of the main frame 22 that is lower than a portion thereof at which the seat rails 27 are connected. The backstay 28 can include a pair of portions, e.g., left and right portions. A rear arm 29 can be coupled to a lower end portion of the main frame 22 via a pivot shaft 30. The rear wheel can be rotatably fitted to a rear end portion of the rear arm 29.

A fuel tank 5 can be mounted above the main frame 22 and the backstay 28 so as to span the main frame 22 and the backstay 28. The fuel tank 5 can be disposed rearward of the head pipe 21. A seat 2 can be provided above and to the rear of the fuel tank 5, as viewed from one side of the motorcycle.

The motorcycle 1 can further include a shroud 50. The shroud 50 can cover a side of at least a portion of the vehicle body frame 20, extend frontward, and extend outward in a widthwise direction of the motorcycle 1. The shroud 50 can include a pair of members: a left-side shroud and a right-side shroud.

Figure 2:
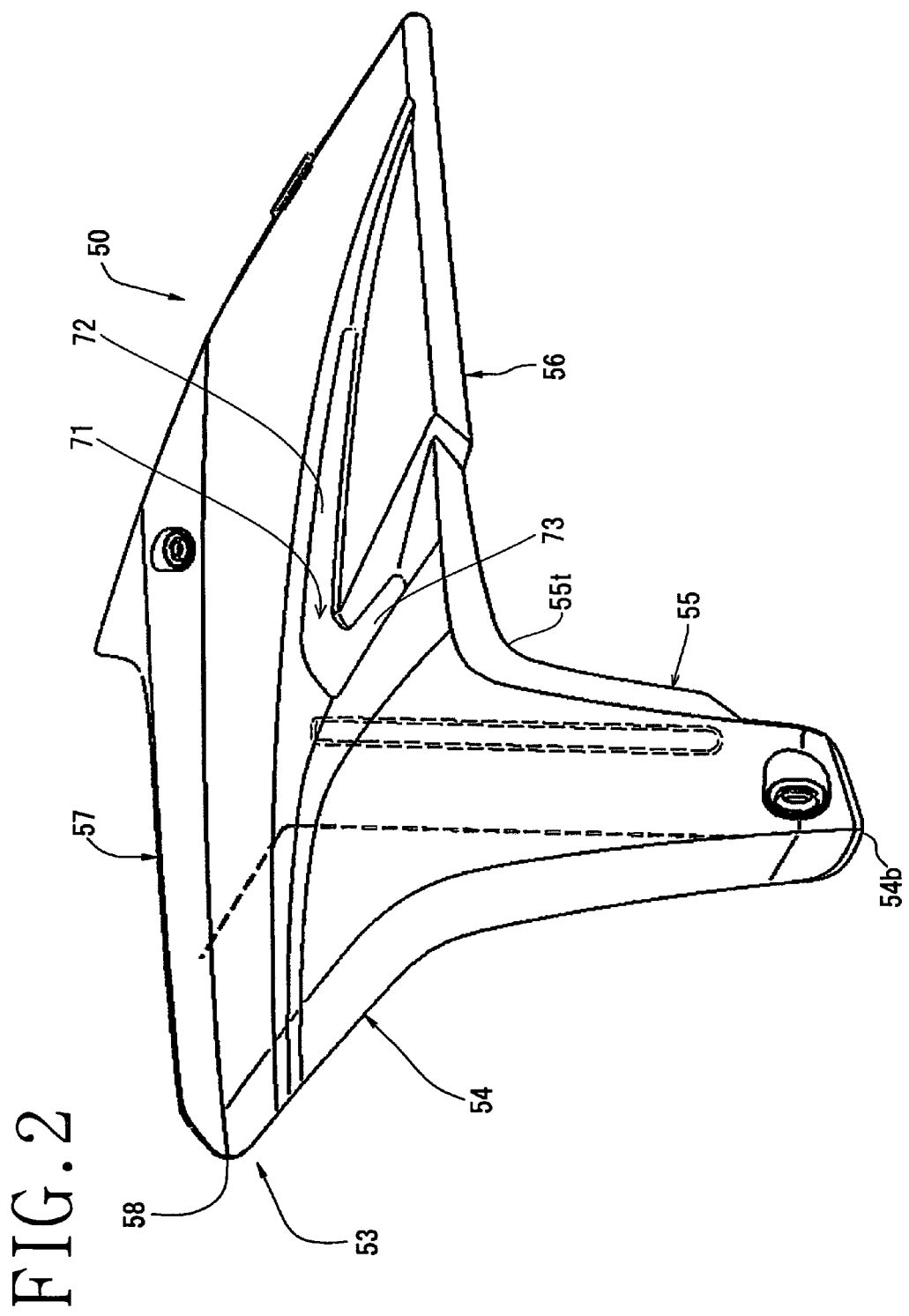
FIG. 2 is a side view illustrating a left-side shroud according to the first exemplary embodiment.

As illustrated in FIGS. 1 and 2, the shroud 50 can have an upper edge portion 57, e.g., an edge part located in an upper region of the shroud 50. The upper edge portion 57 can extend substantially or approximately horizontally, as viewed from one side of the motorcycle. The shroud 50 can cover at least a portion of the under bracket 43, as viewed from one side of the motorcycle. The shroud 50 can include a front end portion 53 that protrudes frontward, as viewed from one side of the motorcycle. The front end portion 53 can be located above a lower end 43b of the under bracket 43

As illustrated in FIG. 2, a front end 58 of the shroud 50 can be located at a front end of the front end portion 53. As illustrated in FIG. 1, the front end 58 of the shroud 50 can protrude frontward of a front end of a portion of the front fork 40 that is located above the under bracket 43, as viewed from one side of the motorcycle. More specifically, the front end 58 of the shroud 50 can be located frontward of the front end of a portion of the front fork 40 that is at least partly covered or overlapped by the front end portion 53, as viewed from one side of the motorcycle.

As illustrated in FIGS. 1 and 2, the shroud 50 can further include a front edge portion 54 and a vertical portion 55. The vertical portion 55 can extend substantially vertically upward, from a location rearward of a lower end 54b of the front edge portion 54.

The larger the vertical extent of the vertical portion 55 (in other words, the higher the height thereof) is, the more the amount of the air flowing through the shroud 50 to the rear will be. Accordingly, the first exemplary embodiment can provide a motorcycle that, as compared to conventional arrangements, can take a greater amount of air inside the shroud from the front, and moreover, can smoothly discharge the air that has been taken inside to the rear of the shroud 50. These features can, for example, provide improved cooled for an engine 7 (see FIG. 1).

The shroud 50 can further include a lower edge portion 56. The lower edge portion 56 can extend, in a substantially front-to-rear direction, from an upper end 55t of the vertical portion 55. Put another way, the lower edge portion 56 can extend substantially horizontally rearward, as viewed from one side of the motorcycle. As illustrated in FIG. 1, the lower edge portion 56 can extend over and along a main frame 22 of the motorcycle 1, as viewed from one side of the motorcycle. Viewed from the opposite side (the right side), the lower edge portion 56 would likewise extend over and along the main frame 22. Thus, the lower edge portions 56 of the left-side shroud and right-side shrouds can be said to straddle or "extend astride" the vehicle body frame 20 and main frame 22, in the sense that the lower edge portions 56 of the left-side shroud and right-side shrouds can be situated on both sides of the vehicle body frame 20 and main frame 22.

As illustrated in FIG. 1, the motorcycle 1 can include a front fender 90. The front fender 90 can cover a region over the front wheel 3, and be fitted to the under bracket 43. The front fender 90 can be stationary relative the front fork 40. For example, when the front fork 40 moves to accommodate shocks, the front fender 90 can be stationary relative to the movement of the front fork 40.

Figure 3:
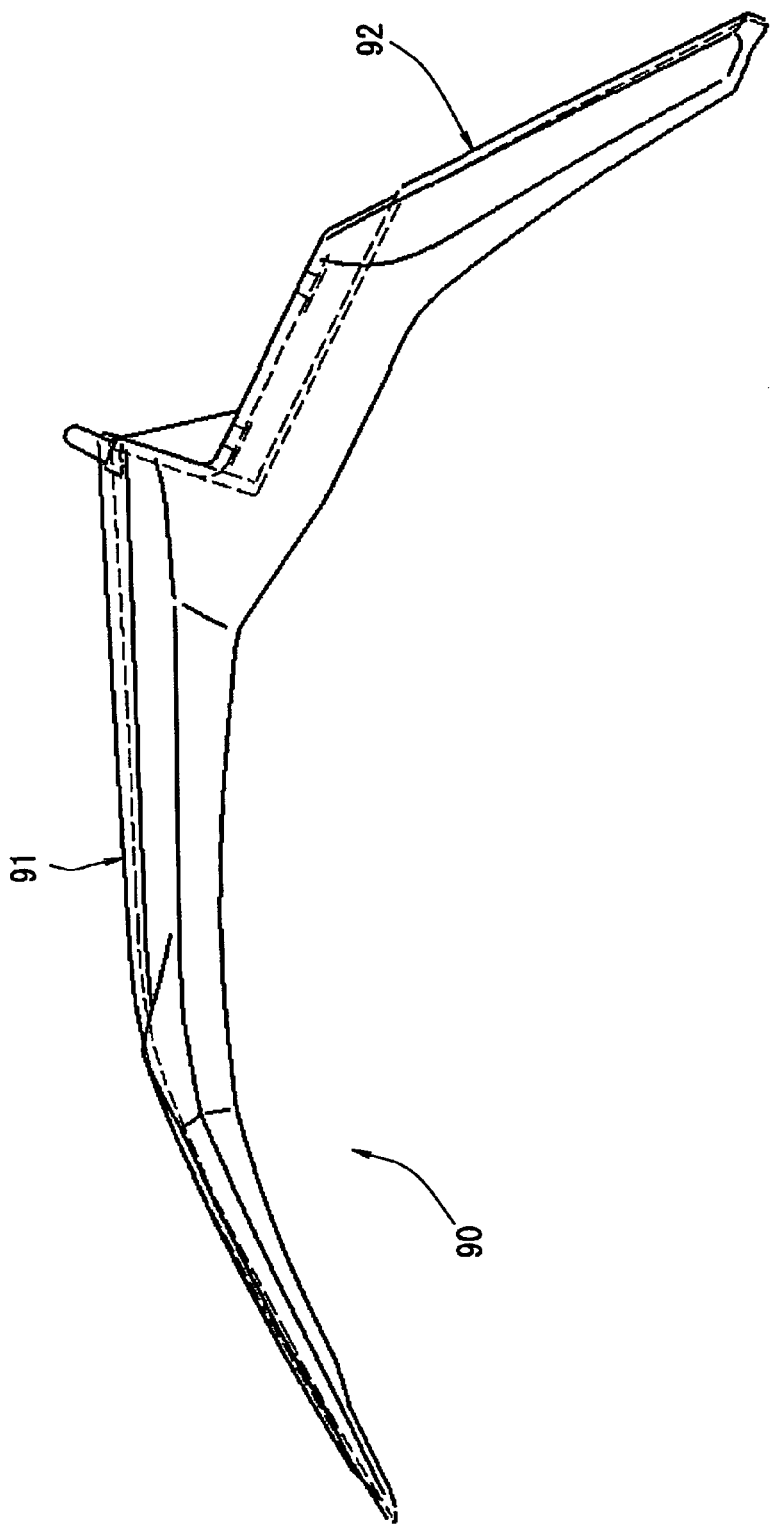
FIG. 3 is a side view illustrating a front fender according to the first exemplary embodiment.

As illustrated in FIGS. 1 and 3, the front fender 90 can include an upper edge portion 91. The upper edge portion 91 can extend substantially horizontally, along a line L1 corresponding to a frontward extension of the upper edge portion 57 of the shroud 50, as viewed from one side of the motorcycle. The front fender 90 can further include a rear back face portion 92, extending obliquely downward and rearward, as viewed from one side of the motorcycle. A gap 9 can be formed between the front edge portion 54 of the shroud 50 and the back face portion 92 of the front fender 90.

As illustrated in FIG. 1, the motorcycle 1 can equipped with an engine 7 including a cylinder 8.

The motorcycle 1 can further include a radiator (not shown) supported by the vehicle body frame 20 and disposed, for example, inward of the shroud 50. The radiator can include a radiator tank storing a coolant for cooling the engine 7. The engine 7 is not limited to being a radiator-cooled engine. Alternatively, the engine 7 can be an air-cooled engine, e.g., cooled by flowing air or the like.

As illustrated in FIG. 1, an opening 71 can be formed in the shroud 50. The opening 71 can extend in a front-to-rear direction (e.g., a substantially or approximately horizontal direction with respect to the orientation of the motorcycle 1 shown in FIGS. 1 and 2). The opening 71 can extend across a portion of the main frame 22, as viewed from one side of the motorcycle, so that the portion of the main frame abuts or is adjacent to the opening 71. A size of the opening 71 along the front-to-rear direction can be larger than a size of the portion of the main frame 22 abutting or adjacent to the opening 71.

As illustrated in FIG. 2, the opening 71 can have a first opening portion 72 and a second opening portion 73. The first opening portion 72 can extend substantially horizontally. More specifically, an extent of the first opening portion 72 in a substantially horizontal (or front-to-rear) direction can be larger than an extent of the first opening portion 72 in other directions. For example, as shown in FIG. 2, an extent of the first opening portion 72 along the substantially front-to-rear direction is larger than an extent of the first opening portion 72 along a substantially vertical direction.

The first opening portion 72 can be formed so as to be tapered in at least a rearward direction. Additionally, as more easily seen in FIG. 2, the opening 71 can be formed so as to be tapered in both the frontward direction and the rearward direction, as viewed from one side of the motorcycle. Due at least in part to the shape of the first opening portion 72, rearward airflow discharged from the first opening portion 72 can be narrowed, or at least not widened. As a result, the flow velocity of the air discharged from the shroud 50 can be kept approximately constant or at least unreduced. Thus, air taken inside the shroud 50 can be smoothly and efficiently discharged to the rear through the first opening portion 72.

The second opening portion 73 of the opening 71 can extend obliquely downward and rearward, as viewed from one side of the motorcycle.

As a result, in the shroud 50, the size of the opening 71 along the vertical direction can be made relatively large.

Advantageously, the larger the size of the opening 71 along the vertical direction is (put another way, the greater the height of opening 71, or the wider opening 71 is in the vertical direction), the greater the amount of the air flowing through the shroud will be.

Therefore, the air taken inside the shroud 50 can be smoothly discharged outside the shroud 50.

Put in other terms, the vehicle shroud 50 according to the first exemplary embodiment can comprise a frontward portion having, in a side view of the vehicle shroud 50, an upper edge 57, a nose 58 and a lower obliquely-extending edge 54. The upper edge 57, the nose 58, and the lower obliquely-extending edge 54 can form a frontward-projecting wedge shape.

The vehicle shroud 50 can further comprise an intermediate portion having, in the side view, a substantially downward-extending edge, a bottom edge defined at least in part by a lower end 54b, and an upward-extending edge 55. The vehicle shroud 50 can still further comprise a rearward portion having a substantially rearward-extending edge 56.

The vehicle shroud 50 can have formed therein a branched or bifurcated opening 71, having a first branch 72 and a second branch 73, the first branch 72 being longer than the second branch 73. The first branch 72 and the second branch 73 can converge at a region of convergence in approximately a middle part of the vehicle shroud 50, and separate and taper from the region of convergence toward an end of the vehicle shroud 50. A greater extent of the branched opening 71 can be located in the rearward portion than in the frontward portion or the intermediate portion.

When the vehicle shroud 50 is in place on a vehicle such as a motorcycle 1, the upper edge 57 can extend substantially horizontally, and be substantially aligned with a substantially horizontal portion 91 of a fender 90 of the vehicle. Moreover, when the vehicle shroud is in place on the motorcycle 1, the frontward portion can at least partly overlap a front fork 40 of the motorcycle 1, and the first branch 72 can be above the second branch 73. In particular, the nose 58 of the vehicle shroud 50 can extend beyond a front edge of the front fork 40, in a side view.

(Operations and Effects)

As described previously, the upper edge portion 57 of the shroud 50 can extend substantially horizontally, as viewed from one side of the motorcycle, and be substantially aligned with the upper edge portion 91 of the front fender 90. Thus, air from the front of the motorcycle 1, flowing along the upper edge portion 91 of the front fender 90, can be introduced in a comparatively greater amount into the shroud 50, and be discharged through the opening 71 and flow to the rear more easily.

Moreover, as described previously, the upper edge portion 57 of the shroud 50 can be substantially aligned with the frontward extended line L1, and the shroud 50 can cover at least a portion of the under bracket 43, as viewed from one side of the motorcycle (see FIG. 1). Thus, air flow to the front of the shroud 50 can be less adversely affected by the under bracket 43 when taken inside the shroud 50. As a result, the motorcycle 1 can inhibit reduction of the amount of the air taken inside the shroud 50.

As additionally described in the foregoing, the front end 58 of the shroud 50 can protrude frontward of a front end of a portion of the front fork 40 that is located above the under bracket 43, as viewed from one side of the motorcycle. As illustrated in FIG. 1, at least a portion of the front fork 40 can be overlapped by the front end portion 53 (see FIG. 2), as viewed from one side of the motorcycle. The front end 58 of the shroud 50 can be located frontward of the front end of the portion of the front fork 40, as viewed from one side of the motorcycle. Accordingly, air flowing to the front of the shroud 50 can be less adversely affected by the front fork 40 when taken inside the shroud 50, and as a result, the reduction of the amount of the air taken inside the shroud 50 can be inhibited further.

In view of the foregoing description, according to the first exemplary embodiment, the motorcycle 1 can take in air inside the shroud 50 efficiently, making it possible to reduce the size of the shroud 50 in comparison with conventional structures. In the first exemplary embodiment, the front portion of the shroud 50 can be formed to be compact in size, so that the gap 9 can be formed between the back face portion 92 of the front fender 90 and the front edge portion 54 of the shroud 50.

To further review, the shroud 50 can include a lower edge portion 56. The lower edge portion 56 can extend substantially horizontally rearward, as viewed from one side of the motorcycle (see FIG. 1). Because of the lower edge portion 56, the air taken inside the shroud 50 can be smoothly discharged to the rear. As a result, the shroud 50 can take the air from the front to the inside more efficiently. As described above, a greater amount of air is introduced inside the shroud 50. That is, the shroud 50 can take in a greater amount of air from the front to the inside and also smoothly discharge the air from the inside to the rear. Therefore, the flow of the air taken inside the shroud 50 does not stagnate in the shroud 50.

Second Exemplary Embodiment

In the following, a motorcycle 1 according to a second exemplary embodiment will be described. In the description, parts and components common to both the second exemplary embodiment and the first exemplary embodiment will be denoted by the same reference numerals, and further description will be omitted.

Figure 4:
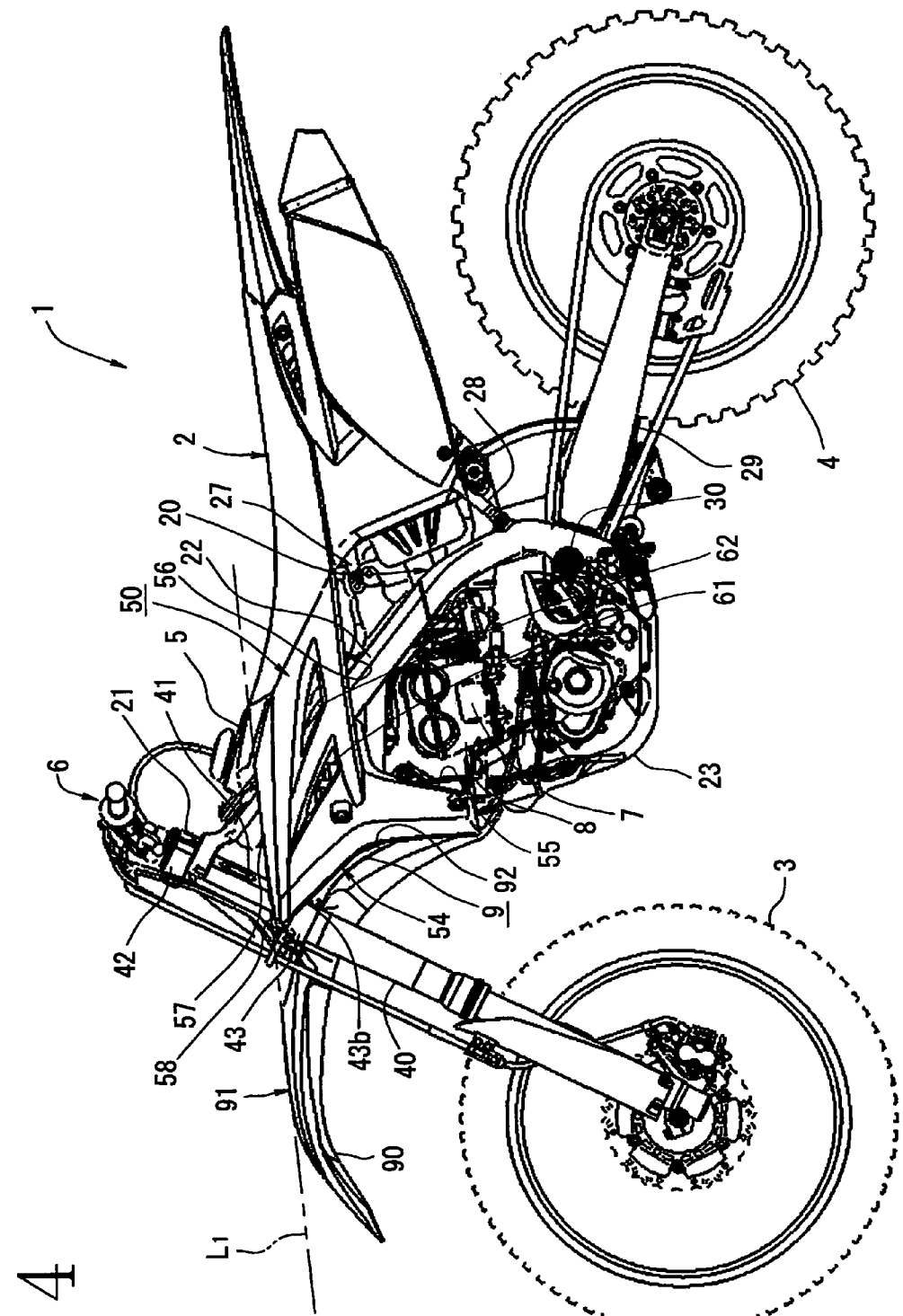
FIG. 4 is a side view illustrating a motorcycle according to a second exemplary embodiment of the invention.
Figure 5:
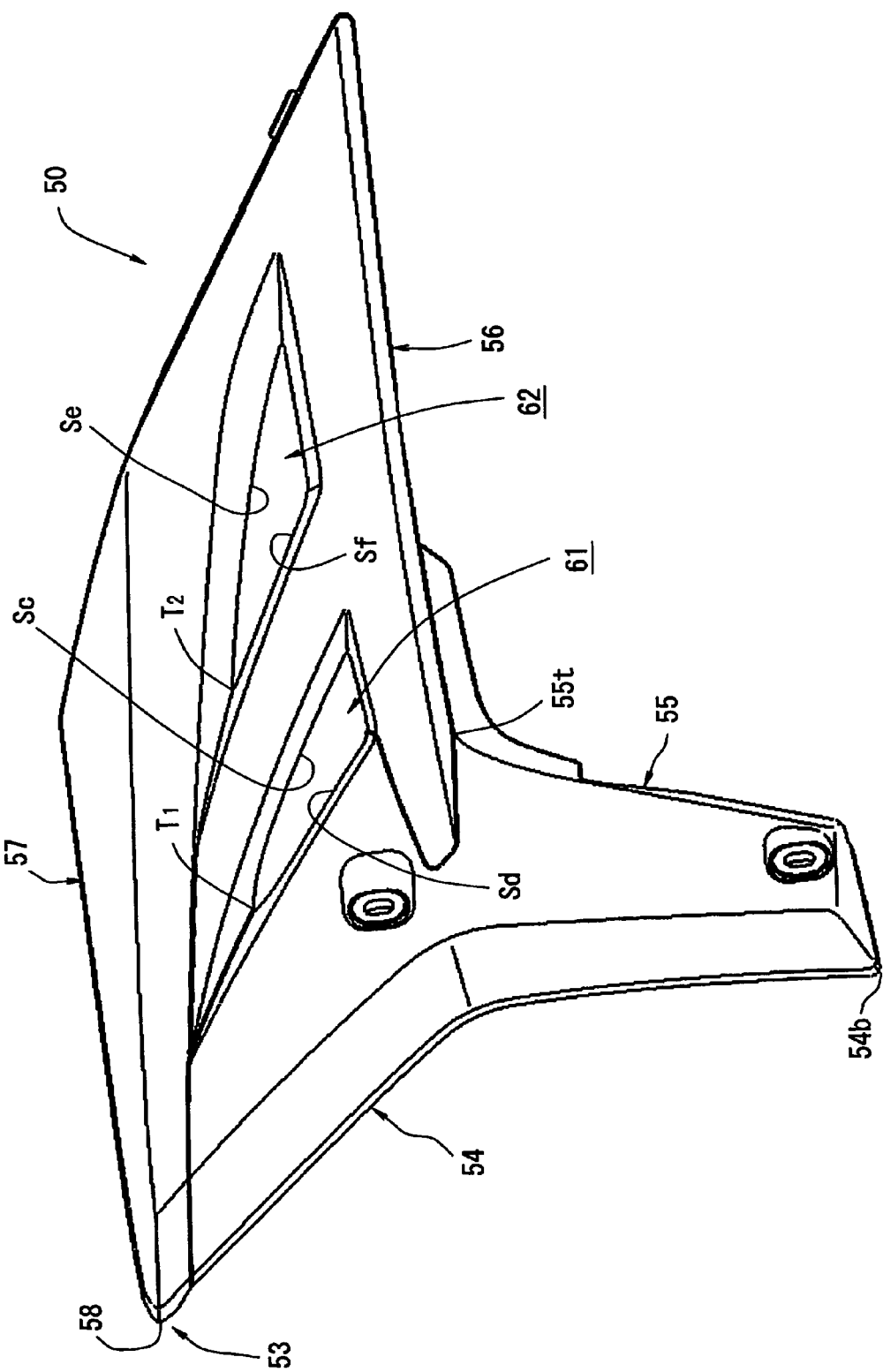
FIG. 5 is a side view illustrating a left-side shroud according to the second exemplary embodiment.

As illustrated in FIG. 4, according to the second exemplary embodiment, an opening 61 and an opening 62 can be formed in a shroud 50. The openings 61 and 62 can be substantially aligned along the front-to-rear direction. As illustrated in FIG. 5, the opening 61 can have a first side Sc and a second side Sd, and be formed in a substantially triangular shape. The first side Sc can extend from a top point T1 obliquely downward and rearward. In a region below the first side Sc, the second side Sd can extend from the top point T1 obliquely downward and rearward.

Likewise, the opening 62 can have a first side Se and a second side Sf, and be formed in a substantially triangular shape. The first side Se can extend from a top point T2 obliquely downward and rearward. In a region below the first side Se, the second side Sf can extend from the top point T2 obliquely downward and rearward. The top point T1 can be located at a front end of the opening 61. The top point T2 is located at a front end of the opening 62.

The openings 61 and 62 formed in the shroud 50 can make it possible for the shroud 50 to more smoothly discharge air that has been taken inside.

Put in other terms, the vehicle shroud 50 according to the second exemplary embodiment can comprise a frontward portion having, in a side view of the vehicle shroud 50, an upper edge 57, a nose 58 and a lower obliquely-extending edge 54. The upper edge 57, the nose 58, and the lower obliquely-extending edge 54 can form a frontward-projecting wedge shape.

The vehicle shroud 50 can further comprise an intermediate portion having, in the side view, a substantially downward-extending edge, a bottom edge defined at least in part by a lower end 54b, and an upward-extending edge 55. The vehicle shroud 50 can still further comprise a rearward portion having a substantially rearward-extending edge 56.

The vehicle shroud 50 can have formed therein a first opening 61 and a second opening 62, each having an approximately triangular shape and being located in approximately a center portion of the vehicle shroud 50. The first opening 61 can extend at least partly over the intermediate portion and the second opening 62 can extend substantially along the rearward portion.

It should be noted that, as illustrated in FIG. 4, the motorcycle 1 according to the present invention can include the rear wheel 4 rotatably fitted to a rear end portion of the rear arm 29.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A motorcycle comprising:
 a front wheel;
 a front fork for supporting the front wheel;
 an under bracket coupled to the front fork;
 a steering shaft coupled to the front fork via the under bracket;
 a head pipe for rotatably supporting the steering shaft;
 a body frame extending from the head pipe obliquely downward and rearward, as viewed from one side of the motorcycle;
 a shroud having an upper edge portion extending substantially horizontally as viewed from one side of the motorcycle, the shroud covering a side of at least a portion of the frame, extending frontward, and extending outward in a widthwise direction of the motorcycle; and
 a front fender including an upper edge portion extending substantially horizontally, as viewed from one side of the motorcycle, the front fender attached to the under bracket and covering a region over the front wheel,
 wherein the upper edge portion of the shroud is disposed at the front of the shroud, and
 wherein the upper edge portion of the front fender is substantially horizontally aligned with the upper edge portion of the shroud in a substantially horizontal plane, as viewed from one side of the motorcycle.

2. The motorcycle according to claim 1, wherein the shroud covers at least a portion of the under bracket, as viewed from one side of the motorcycle.

3. The motorcycle according to claim 1, wherein:
 the shroud includes a front edge portion extending obliquely downward and rearward, as viewed from one side of the motorcycle;

the front fender includes a back face portion extending obliquely downward and rearward, as viewed from one side of the motorcycle; and a gap is formed between the front edge portion of the shroud and the back face portion of the front fender.

4. The motorcycle according to claim 1, wherein the shroud has a lower edge portion extending substantially horizontally rearward, as viewed from one side of the motorcycle.

5. A vehicle shroud, comprising:
a frontward portion;
an intermediate portion;
a rearward portion;
the frontward portion having, in a side view of the vehicle shroud, an upper edge, a nose, and a lower obliquely-extending edge;
the intermediate portion having, in the side view, a substantially downward-extending edge, a bottom edge, and an upward-extending edge; and
the rearward portion having, in the side view, a substantially rearward-extending edge;
wherein the shroud has a branched opening formed therein, the branched opening having a first branch and a second branch, the first branch being longer than the second branch.

6. The vehicle shroud of claim 5, wherein the first branch and the second branch converge at a region of convergence in approximately a middle part of the vehicle shroud, and separate and taper from the region of convergence toward an end of the vehicle shroud.

7. The vehicle shroud of claim 6, wherein when the vehicle shroud is in place on a vehicle, in a side view the upper edge extends substantially horizontally, and is substantially aligned with a substantially horizontal portion of a fender of the vehicle.

8. The vehicle shroud of claim 7, wherein the vehicle is a motorcycle.

9. The vehicle shroud of claim 7, wherein when the vehicle shroud is in place on the motorcycle, the nose extends beyond a front edge of a front fork of the motorcycle, in side view.

10. The vehicle shroud of claim 5, wherein when the vehicle shroud is in place on a vehicle, the first branch is above the second branch.

11. The vehicle shroud of claim 5, wherein a greater extent of the branched opening is located in the rearward portion than in the frontward portion or the intermediate portion.

12. A vehicle shroud, comprising:
a frontward portion;
an intermediate portion;
a rearward portion;
the frontward portion having, in a side view of the vehicle shroud, an upper edge, a nose, and a lower obliquely-extending edge;
the intermediate portion having, in the side view, a substantially downward-extending edge, a bottom edge, and an upward-extending edge; and
the rearward portion having, in the side view, a substantially rearward-extending edge;
wherein in a side view of the vehicle shroud, first and second openings each having an approximately triangular shape are formed in approximately a center portion of the vehicle shroud, the first opening extending at least partly over the intermediate portion and the second opening extending substantially along the rearward portion; and
wherein when the vehicle shroud is in place on a vehicle, in a side view the upper edge extends substantially horizontally, and is substantially aligned with a substantially horizontal portion of a fender of the vehicle.

13. The vehicle shroud of claim 12, wherein, in a side view of the vehicle shroud, each of the first and second openings has a first side extending from a predetermined top point obliquely downward and rearward, and a second side extending from the top point obliquely downward and rearward.

14. The vehicle shroud of claim 12, wherein the upper edge, the nose, and the lower obliquely-extending edge form a frontward-projecting wedge shape.

15. The vehicle shroud of claim 14, wherein the vehicle is a motorcycle.

16. The vehicle shroud of claim 14, wherein when the vehicle shroud is in place on a motorcycle, the frontward-projection wedge shape at least partly overlaps a front fork of the motorcycle.

17. The motorcycle according to claim 1, wherein the upper edge portion of the shroud is an edge part located in an upper region of the shroud.

* * * * *